United States Patent [19]

Chu

[11] Patent Number: 4,481,173

[45] Date of Patent: Nov. 6, 1984

[54] MANUFACTURE OF LOW SODIUM ZEOLITE

[75] Inventor: Pochen Chu, West Deptford, N.J.

[73] Assignee: Mobil Oil Corporation, New York, N.Y.

[21] Appl. No.: 443,497

[22] Filed: Nov. 22, 1982

[51] Int. Cl.$^3$ ............................................. C01B 33/28
[52] U.S. Cl. .................................... 423/277; 423/326; 423/328; 423/329; 423/330; 423/331; 423/332; 423/333; 502/77; 502/202
[58] Field of Search .................. 502/77, 202; 423/328, 423/329, 277, 326

[56] References Cited

U.S. PATENT DOCUMENTS

| | | | |
|---|---|---|---|
| 3,699,139 | 10/1972 | Rubin et al. | 423/328 |
| 3,709,979 | 1/1973 | Chu | 423/328 |
| 4,108,881 | 8/1978 | Rollmann et al. | 423/328 |
| 4,151,189 | 4/1979 | Rubin et al. | 423/329 |
| 4,229,424 | 10/1980 | Kokotailo | 423/328 |
| 4,401,637 | 8/1983 | Marosi et al. | 423/328 |
| 4,404,175 | 9/1983 | Marosi et al. | 423/328 |

FOREIGN PATENT DOCUMENTS 14059  6/1980  European Pat. Off. ............ 423/328

*Primary Examiner*—Edward J. Meros
*Assistant Examiner*—Jackson Leeds
*Attorney, Agent, or Firm*—Alexander J. McKillop; Michael G. Gilman; Richard D. Stone

[57] ABSTRACT

The alkali metal content of zeolite ZSM-11 in its as-synthesized form is reduced by crystallizing the zeolite from a solution containing a source of benzyltrimethyl ammonium ions.

15 Claims, No Drawings

MANUFACTURE OF LOW SODIUM ZEOLITE

FIELD OF THE INVENTION

This invention relates to a process for the manufacture of low sodium zeolites and more particularly to the manufacture of low sodium zeolite ZSM-11.

BACKGROUND OF THE INVENTION

Zeolitic materials, both natural and synthetic, have been demonstrated to have catalytic properties for various types of hydrocarbon conversions. Certain zeolitic materials are ordered, porous crystalline aluminosilicates having a definite crystalline structure within which there is a large number of uniformly sized channels, whose pore dimensions will accept for adsorption molecules of certain dimensions while rejecting those of larger dimensions. They have been defined as a rigid three-dimensional framework of $SiO_4$ and $AlO_4$ in which the tetrahedra are cross-linked by the sharing of oxygen atoms so that the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. They are susceptible to cation exchange, by which it is possible to vary the properties of a given aluminosilicate by suitable selection of the cation. The spaces between the tetrahedra are usually occupied by molecules of water prior to dehydration. Recently, zeolite materials having very high ratios of silicon to aluminum atoms have been prepared, as described, for example, in European patent application No. 14059. Certain zeolites of synthetic origin may be prepared by hydrothermal crystallization from a composition containing water, the elements of sodium oxide, an oxide of silicon and a source of nitrogen-containing organic cations. A source of aluminum oxide may optionally be present in an amount dependent upon the silica:alumina ratio desired in the final product. Zeolites which have been prepared in this way include zeolites ZSM-5, ZSM-11, ZSM-12, ZSM-23, ZSM-35, ZSM-38 and ZSM-48 which are described, respectively, in U.S. Pat. Nos. 3,702,886 (ZSM-5); 3,709,979 (ZSM-11); 3,832,449 (ZSM-12); 4,076,842 (ZSM-23); 4,016,245 (ZSM-35); 4,046,859 (ZSM-38) and European Pat. No. 15132 (ZSM-48). Reference is made to these patents for details of these zeolites, their preparation, properties and uses.

The identity of the zeolite which is produced from the solution depends in part upon the organic cation which is present in the mixture. Thus, ZSM-5 is normally produced in the presence of tetrapropyl ammonium (TPA) ions, ZSM-11 in the presence of tetrabutyl ammonium (TBA) ions, ZSM-12 in the presence of tetraethyl ammonium ions and ZSM-23, ZSM-35 and ZSM-38 in the presence of ethylenediamine, pyrrolidine or 2-hydroxyalkyl trialkyl ammonium ions, as described in the patents referred to above. Other organic cations have yielded other zeolites, for example, the synthetic zeolite described in U.S. Pat. No. 3,699,139 is prepared in the presence of benzyltrimethyl ammonium cations.

In their as-synthesized form, the zeolites frequently contain large amounts of alkali or alkaline earth metal ions which are derived from the synthesis composition. Because the presence of these ions is often undesirable if the zeolite is to have satisfactory catalytic activity, they must be removed by ion-exchange before the zeolite is ready for use. If the content of the alkali or alkaline earth metal ions is to be reduced to an adequately low figure, usually less than 0.05 weight percent, repeated and lengthy ion-exchange may be necessary. These steps are expensive to carry out and it would therefore be desirable to find a way of preparing a zeolite directly in a form which has a low content of alkali metal cations.

These difficulties are compounded if the zeolite contains bulky organic cations and in such cases, even lengthy ion exchange procedures may not be sufficient to remove the alkali metal cations. Removal of the organic ions, e.g. by calcination, prior to ion exchange is therefore often required.

SUMMARY OF THE INVENTION

It has now been found that zeolite ZSM-11 may be prepared by a synthesis procedure which results in a product of low alkali metal content. According to the present invention, ZSM-11 which is prepared in the presence of benzyltrimethyl ammonium (BZTMA) cations, has a low content of alkali metal or alkaline earth metal cations and may require no exchange step to be catalytically active.

DETAILED DESCRIPTION OF THE INVENTION

The metallic cations which have conventionally been present in the zeolites in their as-synthesized forms are derived from the composition used to prepare the zeolites. The identity of the metallic cations has therefore been dependent upon the composition and typically it could contain cations of alkali metals such as lithium, sodium, potassium, rubidium or cesium or of alkaline earth metals such as magnesium, calcium, strontium or barium. In most cases, the metallic cations present in the solution have been sodium cations and the resulting zeolite has contained an excessive amount of sodium cations for it to have adequate catalytic activity. The present invention permits the content of metallic cations present in the as-synthesized zeolite to be reduced. Normally, this means that the content of sodium cations in the as-synthesized zeolite will be lower and for this reason, the invention will for convenience be described below with reference to the production of the low sodium zeolite, but it would be understood that the synthesis procedure described will be useful also in reducing the content of other metallic cations derived from the synthesis composition in the resulting zeolite. Thus, if cations of other metals, especially the alkali metals such as lithium, potassium, rubidium or cesium or alkaline earth metals such as magnesium, calcium, strontium or barium are present in the composition from which the zeolite is prepared, the amount of these ions present in the resulting zeolite may also be reduced to a significant extent.

The low sodium zeolite ZSM-11 is prepared by the use of benzyltrimethyl ammonium (BZTMA) cations in the composition from which the zeoite is prepared. The amount of BZTMA compound present is suitably such that the molar ratio of BZTMA cations (calculating as the oxide $(BZTMA)_2O$) to the total organic cations (calculated as the oxide) is from 0.01:1 to 0.99:1, preferably from 0.1:1 to 0.5:1. Additionally, the composition will also contain sodium oxide (or an oxide of another alkali or alkaline earth metal), an oxide of silicon or germanium, water and, optionally, an oxide of aluminum, gallium or another trivalent metal such as iron, boron or chromium. The composition of the mixture, in terms of molar ratios, expressed as oxides, will be as follows:

TABLE 1

| | BROAD | PREFERRED |
|---|---|---|
| $YO_2/WO_2$ | 10-infinity | 25-1000 |
| $OH^-/YO_2$ | 0.001-0.40 | 0.05-0.20 |
| $H_2O/YO_2$ | 5-3000 | 10-250 |
| $R_2O/(R_2O + M_{2O})$ | 0.05-0.99 | 0.2-0.9 |
| $(BZTMA)_2O/R_2O$ | 0.01-0.99 | 0.1-0.5 | where R is the total organic cation present, M is an alkali metal or alkaline earth metal cation of valence n, Y is silicon or germanium, preferably silicon, and W is aluminum, gallium or another trivalent metal such as iron, boron or chromium, preferably aluminum (if present at all).

The reaction mixture can be prepared from materials which can supply the appropriate oxide. Such materials include aluminates, alumina, silicates, silica hydrosol, silica gel, silicic acid and hydroxides. Each oxide component can be supplied by one or more essential reactants and they can be mixed together in any order. For example, any oxide can be supplied by an aqueous solution, e.g., sodium hydroxide or by an aqueous solution of a suitable silicate; the organic nitrogen-containing cation can be supplied by a compound of that cation, such as, for example, a salt; silica may be supplied by solutions of sodium silicate, silica hydrosols, silica gel or silicic acid and sodium hydroxide. The benzyltrimethyl ammonium (BZTMA) cations may conveniently be supplied by the use of the BZTMA halides, expecially the chloride or bromide, or BZTMA hydroxide. The reaction mixture can be prepared either batchwise or continuously. Crystal size and crystallization time will vary with the nature of the reaction mixture employed.

The organic content of the composition will be supplied partly by the BZTMA compound and partly by a quaternary compound of an element of Group VB of the Periodic Table (the Periodic Table used in this specification is the IUPAC Table shown, for example, in the Periodic Chart of the Fisher Scientific Company, Catalog No. 4-702-10).

The quaternary compounds may be derived, as described in U.S. Pat. No. 3,709,979 from Group VB elements including nitrogen, phosphorus, arsenic, antimony or bismuth but normally will be quaternary ammonium compounds with an alkyl or aryl group having 2 to 7 carbon atoms and which may be the same or different, e.g., tetraethyl, tetrapropyl or tetrabutyl ammonium compounds. These compounds are conveniently introduced into the reaction mixture in the form of their halides, especially the chloride or the bromide, or their hydroxide. In preparing the phosphonium species of the zeolite, tetrabutylphosphonium chloride is particularly desirable as a means of incorporating the quaternary metal compound in the zeolite.

The reaction mixture is maintained under hydrothermal reaction conditions until the zeolite crystallizes in the desired form. Preferably crystallization is performed under pressure in an autoclave or static bomb reactor. The temperature ranges from 100°-200° C., generally, but at lower temperatures, e.g., about 100° C. crystallization time is longer. Thereafter, the crystals are separated from the liquid, water-washed dried and recovered.

The zeolite which is obtained from the reaction mixture containing the BZTMA is characterized by a low content of alkali metal or alkaline earth metal cations. If the alkali or alkaline earth metal cations are associated with aluminum sites in the zeolites, no more than 10% of these sites should be associated with alkali metal or alkaline earth metal cations and preferably the number of sites so associated will be less than 5% of the total. In general terms, these amounts will normally correspond to a proportion which is typically below 0.2 or 0.1 and, in favorable cases, below 0.05, percent by weight of the zeolite (all percentages and ratios in this specification are by weight unless stated to the contrary or the context so indicates). The proportion of aluminum sites associated with alkali metal or alkaline earth metal cations will be somewhat higher with the zeolites which have relatively higher silica:alumina ratios, e.g. above 120:1 since increases in the silica:alumina ratio mean that progressively fewer aluminum sites become available in the zeolite. In all cases, however, the content of the alkali and alkaline earth metals in the as-synthesized form of the zeolite will be reduced.

The zeolite has the characteristic structure of zeolite ZSM-11 which is manifested by its X-ray data shown in Table 2 below, for the sodium form of the zeolite.

TABLE 2

| ZSM-11 X-Ray Pattern | |
|---|---|
| Interplanar Spacing (A.): | Relative Intensity |
| 11.2 ± .2 | m |
| 10.1 ± .2 | m |
| 6.73 ± .2 | w |
| 5.75 ± .1 | w |
| 5.61 ± .1 | w |
| 5.03 ± .1 | w |
| 4.62 ± .1 | w |
| 4.39 ± .08 | w |
| 3.86 ± .07 | vs |
| 3.73 ± .07 | m |
| 3.49 ± .07 | w |
| (3.07, 3.00) ± .05 | w |
| 2.01 ± .02 | w | the parenthesis around lines 3.07 and 3.00 indicate that they are separate and distinct lines, but are often superimposed. These values were determined by standard techniques. The radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A, corresponding to the recorded lines, were calculated. The intensity in the table above is expressed as follows:

m=medium, w=weak and vs=very strong

The as-synthesized forms of ZSM-11 obtained from reaction mixtures containing BZTMA cations will exhibit minor shifts in interplanar spacing and variation of relative intensity compared to the data given above and ion exchange with other cations will also reveal minor shifts and variations although in each case substantially the same pattern, the indicium of the zeolite structure, will be perceived.

The composition of the zeolite in its as-synthesized form will be as follows, in terms of molar ratios of oxides, on an anhydrous basis:

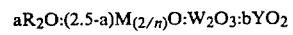

$aR_2O:(2.5-a)M_{(2/n)}O:W_2O_3:bYO_2$ where R, M, W, Y and n are as previously defined and a is from 0.5 to 2.0 and b is at least 10, generally from 10 to 1000. The formula given above allows for an apparent excess of cations to be present since experience has demonstrated that analysis of the zeolites may lead to this apparently anomalous result which is, nevertheless, confirmed by these empirical means.

If the zeolite in its as-synthesized form is calcined, suitably at temperatures of at least 370° C. for at least one minute and normally not more than 20 hours, the organic cations will be decomposed to yield a zeolite of the composition, in terms of molar ratios on an anhydrous basis, as follows:

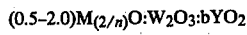

$$(0.5-2.0)M_{(2/n)}O:W_2O_3:bYO_2$$

where M, W, Y and n are as previously defined.

The calcination treatment may be carried out over a wide range of pressures and while subatmospheric or superatmospheric pressures may be employed, atmospheric pressure is desired for reasons of convenience. It is preferred to perform the thermal treatment in the presence of moisture although moisture is not absolutely necessary. The thermal treatment can be performed at a temperature up to about 870° C. at which temperature some degradation of the zeolite structure begins to occur. The thermally treated product is particularly useful in the catalysis of certain hydrocarbon conversion reactions. The zeolite may be subjected to a dehydration step prior to calcination in order to remove water, although this is not essential. Dehydration can be performed at room temperature merely by placing the zeolite catalyst in a vacuum, but a longer time is required to obtain a sufficient amount of dehydration.

Although the zeolite in its as-synthesized form has a low content of alkali metal, typically and as mentioned above, from 0.05 to 0.1 weight percent, further reductions in the alkali or alkaline earth metal content may be achieved by exchange with other cations, especially ammonium cations. If this be done, an exceptionally great reduction in alkali or alkaline earth cation content may be achieved without precalcination of the zeolite; by contrast, ZSM-11 which has not been formed in the presence of BZTMA cations generally requires precalcination to remove organic cations before substantial or, indeed, any reduction of alkali or alkaline earth metal content can be achieved by exchange.

Even though the presently prepared ZSM-11 has a low content of alkali or alkaline earth metal cations, e.g., sodium ions, as synthesized, and therefore may be utilized substantially as synthesized as the catalytic material for a number of hydrocarbon conversion reactions, the original cations of the as-synthesized zeolite can be replaced in accordance with conventional techniques by ion exchange with other cations. Preferred replacing cations include metal ions, ammonium ions, hydrogen ions and mixtures of these ions. These include hydrogen, rare earth metals, aluminum, metals of Groups IIA, IIIA, IVA, VIA, VIIIA, IB, IIB, IIIB and IVB. Of the replacing metallic cations, particular preference is given to cations of metals such as rare earth, Mn, Ca, Mg, Zn, Cd, Pd, Ni, Co, Ti, Al, Sn, Fe and Co.

A typical ion exchange technique involves contacting the zeolite with a salt of the desired replacing cation or cations. Although a wide variety of salts can be employed, particular preference is given to chlorides, nitrates and sulfates. Representative ion exchange techniques are disclosed in a wide variety of patents including U.S. Pat. Nos. 3,140,249; 3,140,251 and 3,140,253 to which reference is made for details of typical techniques.

Following contact with the salt solution of the desired replacing cation, the zeolite is then preferably washed with water and dried at a temperature typically ranging from 60° to 300° C. and thereafter may be calcined in air or inert gas at temperatures typically ranging from 250° to 800° C. for periods of time ranging from 1 to 48 hours or more to produce a catalytically active material.

Regardless of cation replacement, the spatial arrangement of the framework atoms which form the basic crystal lattice of the zeolite remains essentially unchanged, as confirmed by the X-ray powder diffraction pattern of the ion-exchanged material.

The zeolite may be used in the organic nitrogen-containing form, the alkali metal form, the hydrogen form or another univalent or multivalent cationic form. It may also be used in intimate combination with a hydrogenating component such as tungsten, vanadium, molybdenum, rhenium, nickel, cobalt, chromium, manganese, or a noble metal such as platinum or palladium where a hydrogenation/dehydrogenation function is to be performed. Such components can be exchanged into the composition, impregnated into it, or physically admixed with it. Components can be impregnated into the zeolite, by treating the zeolite with a solution of a metal-containing ion. For example, suitable platinum compounds for this purpose include chloroplatinic acid, platinous chloride and various compounds containing the platinum amine complex. Combinations of metals and methods for their introduction can also be used.

Catalysts containing ZSM-11 prepared according to the invention can be prepared in many forms, such as powders, granules or molded products such as extrudate having particle size sufficient to pass through a 2 mesh (Tyler) screen and be retained on a 400 mesh (Tyler) screen. The catalyst can be extruded before drying or partially dried and then extruded.

It may be desirable to composite the zeolite with another material resistant to the temperatures and other conditions employed in organic conversion processes. Such matrix materials include active and inactive materials and synthetic or naturally occurring zeolites as well as organic materials such as clays, silica and metal oxides. The latter may be either naturally occurring or in the form of gelatinous precipitates, sols or gels including mixtures of silica and metal oxides. Use of an active material tends to improve the conversion, selectivity, or both of the catalyst in certain organic conversion processes. Inactive materials suitably serve as diluents to control the amount of conversion in a given process so that products can be obtained economically and orderly without employing other means for controlling the rate of reaction. The zeolite may be incorporated into naturally occurring clays, e.g., bentonite and kaolin which function, in part, as binders for the catalyst. Naturally occurring clays which can be composited with the zeolite include the montmorillonite and kaolin family. The clays can be used in the raw state or initially subjected to calcination, acid treatment or chemical modification.

The zeolite may also be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-thoria, silica-alumina-zirconia, silica-alumina-magnesia and silica-magnesia-zirconia. The matrix can be in the form or a cogel. A mixture of these compounds could also be used. The relative proportions of finely divided crystalline zeolite and inorganic oxide gel matrix or binder may typically range from 1 to 90 weight percent zeolite, more usually 2 to 50 weight percent zeolite, based on the weight of the composite.

ZSM-11 prepared by the present method may be used in a wide variety of organic compound conversion processes, e.g., of hydrocarbon compounds and oxygenates such as methanol. Such processes include, for example, alkylation of aromatics with olefins, aromatization of normally gaseous olefins and paraffins, aromatization of normally liquid low molecular weight paraffins and olefins, isomerization of aromatics, paraffins and olefins, disproportionation of aromatics, transalkylation of aromatics, oligomerization of olefins and cracking and hydrocracking. ZSM-11 is of particular utility as a catalyst in the conversion of methanol to gasoline and other hydrocarbons because it is able to catalyze the conversion with a lower yield of durene. Methanol to hydrocarbon conversion processes are described, for example, in U.S. Pat. Nos. 4,148,835, 4,138,442, 4,035,430, 4,039,600, 3,899,544, 3,709,915 and British Pat. No. 1,446,522 to which reference is made for details of these exemplary processes.

The invention is illustrated by the following Examples.

EXAMPLES 1

A silicate solution was prepared by dissolving 3.44 kg of sodium silicate (Q-Brand-trademark) in 4 liters of water. An acid alum solution was made by adding 119 g of $Al_2(SO_4)_3 \cdot 14H_2O$, 350 g of $H_2SO_4$ (100%), 500 g of benzyltrimethyl ammonium chloride (BZTMACl) as a 60% aqueous solution and 515 g of tetrabutyl ammonium bromide (TBABr) to 5 liters of water. These two solutions were charged to a 20 liter agitated autoclave and the resulting gel was whipped for one hour at room temperature at 250 rpm agitation. The gel pH was 8.7. The gel was crystallized in the autoclave at 160° C. with 90 rpm agitation for about 60 hours.

The identity of the washed product was confirmed as ZSM-11 by X-ray diffraction. The structural silica:alumina ratio was 75:1 and the sodium content 0.07 weight percent to give a Na:Al ratio of 0.08:1. The sodium content was reduced further to 0.03 weight percent by exchange with ammonium nitrate solution without requiring precalcination.

EXAMPLE 2

A silicate solution was prepared by dissolving 3.6 kg. of sodium silicate (Q-Brand trademark) in 4 liters of water. An acid solution was made by adding 180 g. of boric acid ($H_3BO_3$), 400 g of benzyl trimethylammonium chloride (60 percent) solution and 600 g of tetrabutylammonium bromide (TBABr) in 5 kg of water. The silicate and acid solutions were charged into a 20 l agitated autoclave simultaneously to form a gel. Crystallization was conducted over 4 days at 160° C. while autoclave agitation was maintained at 90 rpm. The resulting water-washed, dried crystalline product had the X-ray diffraction pattern of ZSM-11 and was found to have a silica:alumina ratio of 503:1, a sodium content of 0.04% and a Na:Al ratio of 0.43:1.

EXAMPLE 3

A silicate solution was prepared by dissolving 68.7 g of sodium silicate (Q-Brand) in 40 g of water. An acid aluminum solution was prepared by adding 2.4 g of aluminum sulfate, 7 g of sulfuric acid 6.8 g of TBABr and 6.0 g of BZTMACl(60%) in 50 g of water. The silicate and acid aluminum solutions were then mixed together to form a gel which was charged to a static stainless steel reactor with a polytetrafluoroethylene (Teflon-trademark) liner. The crystallization was carried out at 138° C. for 300 hours without any agitation. The water washed product was found to be ZSM-11 having a silica:alumina ratio of 123:1, a sodium content of 0.07% weight and an Na:Al ratio of 0.1:1.

EXAMPLE 4

This batch of ZSM-11 was prepared by the same method described in Example 3 except the amount of BZTMACl was reduced to one half the amount of Example 3. After 240 hours crystallization at 138° C. The resulting crystal was found to be 130% ZSM-11 (by X-ray diffraction, determination of line intensity by comparison with a small crystal standard) having a silica:alumina ratio of 125:1, a sodium content of 0.15% weight and an Na:Al ratio of 0.23:1.

EXAMPLE 5

A silicate solution was prepared by dissolving 137.5 g of sodium silicate in 80 g of water. An acid solution was prepared by adding 2.4 g of aluminum sulfate, 49 g of TBABr and 50 g of BZTMACl (60%) in 80 g of water. The above two solutions were mixed to form a gel which was then charged into stainless steel reactor with a Teflon liner. The crystallization was conducted at 162° C. without agitation for 120 hours. The resulting, water washed, dried product was found by X-ray diffraction to be 130% ZSM-11. The silica:alumina ratio of the product was found to be 68:1, the sodium content to be 0.05% weight and the Na:Al ratio of 0.05:1.

EXAMPLE 6

An aluminate solution was prepared by dissolving 4.8 g of aluminum sulfate, 5.8 g of NaOH, 83.5 g of TBABr and 20 g of BZTMACl(60%) in 280 g of water. 43.2 g of precipitated silica (Hi-Sil, trademark of PPG Industries) was added to the above solution to form a thick slurry which then was transferred into a static bomb reactor to conduct crystallization at 160° C. After 41 hours, the resulting solid product was 110% ZSM-11. The water washed and dried product was found to have a silica:alumina ratio of 58:1. The Na content of the washed sample was 0.06% weight, equivalent to an Na:Al ratio of 0.05:1.

EXAMPLE 7

This batch of ZSM-11 was prepared by the same method described in Example 6, except that the amount of TBABr was reduced from 83.5 g to 42 g. The crystallized product after 96 hours at 160° C. was 75% ZSM-11. The silica:alumina ratio was found to be 60:1, the sodium content 0.08% weight and the Na:Al ratio 0.06:1.

The formulation, crystallization and properties of the product of the above seven examples is summarized in Table 3 below for comparison.

TABLE 3

| EXAMPLE NO. | 1 | 2 | 3 | 4 | 5 | 6 | 7 |
|---|---|---|---|---|---|---|---|
| Formulation | | | | | | | |
| Silicate Solution | | | | | | | |
| Q-Brand, g | 3440 | 3600 | 68.7 | 68.7 | 137.5 | — | — |
| Hi-Sil, g | — | — | — | — | — | 43.2 | 43.2 |
| H$_2$O, g | 4000 | 4000 | 40 | 40 | 80 | — | — |
| Acid Alum Solution | | | | | | | |
| Al$_2$(SO$_4$)$_3$.14H$_2$O, g | 119 | — | 2.4 | 2.4 | 2.4 | 4.8 | 4.8 |
| H$_2$SO$_4$ (100%), g | 350 | — | 7.0 | 7.0 | 13.6 | — | — |
| NaOH (100%), g | — | — | — | — | — | 5.8 | 5.6 |
| TBABr, g | 515 | 600 | 6.8 | 6.8 | 49 | 83.5 | 42 |
| BZTMACl (60%), g | 500 | 400 | 6.0 | 3.0 | 50 | 20 | 20 |
| H$_2$O, g | 5000 | 5000 | 50 | 50 | 80 | 280 | 280 |
| Crystallization | | | | | | | |
| Temp., °C. | 160 | 160 | 138 | 138 | 162 | 160 | 160 |
| Agitation, rpm | 90 | 90 | Static | Static | Static | Static | Static |
| Time, Hr. | 60 | 96 | 300 | 240 | 120 | 41 | 96 |
| Crystallinity, % | 100 | 120 | 190 | 130 | 130 | 110 | 75 |
| SiO$_2$/Al$_2$O$_3$ of product | 75 | 503 | 123 | 125 | 68 | 58 | 60 |
| Na % Wt. of product | 0.07 | 0.04 | 0.07 | 0.15 | 0.05 | 0.06 | 0.08 |
| Na/Al | 0.07 | 0.43 | 0.10 | 0.23 | 0.05 | 0.05 | 0.06 |

I claim:

1. In a method for the preparation of zeolite ZSM-11 by crystallization of the zeolite from a composition containing sources of alkali metal oxide, silicon oxide and a quaternary alkyl ammonium compound having alkyl groups of 2 to 7 carbon atoms, the improvement which comprises adding to the composition a source of benzyltrimethyl ammonium cations.

2. In the method of claim 1 the improvement which comprises adding the benzyl trimethylammonium cations in an amount such that the molar ratio on an oxide basis of the benzyltrimethyl ammonium compound to the total organic compound present is from 0.01:1 to 0.99:1.

3. In the method of claim 1 the improvement which comprises adding the benzyl trimethylammonium cations in an amount such that the molar ratio on an oxide basis of the benzyltrimethyl ammonium compound to the total organic compound present is from 0.1:1 to 0.5:1.

4. The method of claim 1 in which the quaternary compound is a tetrabutyl ammonium halide.

5. The method of claim 1 in which the composition also contains a source of aluminum oxide.

6. Zeolite ZSM-11 in the as-synthesized form having a combined content of alkali and alkaline earth metal of not more than 0.2 weight percent and containing as organic cations both quaternary alkyl ammonium compound having an alkyl group having 2 to 7 carbon atoms and benzyltrimethyl ammonium and wherein the molar ratio of benzyltrimethyl ammonium to the total organic cation present is 0.01 to 0.99.

7. Zeolite ZSM-11 according to claim 6 in which the combined content of alkali and alkaline earth metal is not more than 0.05 weight percent.

8. Zeolite ZSM-11 according to claim 6 having the formula, on an anhydrous basis:

a R$_2$O:(2.5-a)M$_2$O:W$_2$O$_3$:bYO$_2$ where R is the total organic cation present, M is an alkali metal or alkaline earth metal of valence n, W is an oxide of aluminum, gallium, iron, boron or chromium, y is silicon, or germanium, a is from 0.5 to 2.5 and b is at least 10.

9. Zeolite ZSM-11 according to claim 8 in which M is alkali metal, W is aluminum and Y is silicon.

10. Zeolite ZSM-11 according to claim 8 in which R comprises tetrabutylammonium and benzyltrimethyl ammonium.

11. Zeolite ZSM-11 according to claim 9 in which no more than 10 percent of the aluminum sites of the zeolite are associated with cations of the alkali metal or alkaline earth metal.

12. Zeolite ZSM-11 according to claim 11 in which no more than 5 percent of the aluminum sites of the zeolite are associated with cations of the alkali metal or alkaline earth metal.

13. Zeolite ZSM-11 according to claim 11 in which the silica:alumina ratio of the zeolite is from 10:1 to 120:1.

14. Zeolite ZSM-11 according to claim 13 in which the silica:alumina ratio of the zeolite is from 10:1 to 70:1.

15. Zeolite ZSM-11 according to claim 8 wherein the molar ratio of benzyltrimethylammonium cations to the total organic cation present is 0.1 to 0.5.

* * * * *

UNITED STATES PATENT AND TRADEMARK OFFICE
CERTIFICATE OF CORRECTION

PATENT NO. : 4,481,173
DATED : November 6, 1984
INVENTOR(S) : Pochen Chu

It is certified that error appears in the above-identified patent and that said Letters Patent is hereby corrected as shown below:

Column 1, lines 32-33, capitalize "patent application".

Column 4, line 3, change "zeolites" to --zeolite--.

Column 9, line 8, insert a parenthesis before "$SO_4)_3$.

Signed and Sealed this

Fourteenth Day of May 1985

[SEAL]

Attest:

DONALD J. QUIGG

Attesting Officer     Acting Commissioner of Patents and Trademarks